United States Patent [19]

Whittemore

[11] 4,289,113
[45] Sep. 15, 1981

[54] EVACUATED FLAT-PLATE SOLAR COLLECTORS

[76] Inventor: Peter G. Whittemore, 47 Elm Ct., Cohasset, Mass. 02025

[21] Appl. No.: 61,498

[22] Filed: Jul. 27, 1979

[51] Int. Cl.³ .............................................. F24J 3/02
[52] U.S. Cl. ................................ 126/418; 126/446; 126/450
[58] Field of Search ............. 126/450, 445, 446, 900, 126/901, 418, 417, 432, 442, 444

[56] References Cited

U.S. PATENT DOCUMENTS

| | | | |
|---|---|---|---|
| 3,961,619 | 6/1976 | Estes | 126/444 |
| 4,076,013 | 2/1978 | Bette | 126/444 |
| 4,080,957 | 3/1978 | Bennett | 126/900 |
| 4,127,105 | 11/1978 | Watt | 126/446 |
| 4,146,057 | 3/1979 | Friedman | 126/436 |

*Primary Examiner*—Samuel Scott
*Assistant Examiner*—G. Anderson
*Attorney, Agent, or Firm*—Richard P. Crowley

[57] ABSTRACT

A structural support system is disclosed for use in an evacuated, flat-plate, solar collector to eliminate the problem of stress fractures in a glass cover plate. Nonlinearly spaced supports are used within the collector to dampen vibrations in the glass cover and to prevent overdeflection before buckling or stress fractures occur.

16 Claims, 4 Drawing Figures

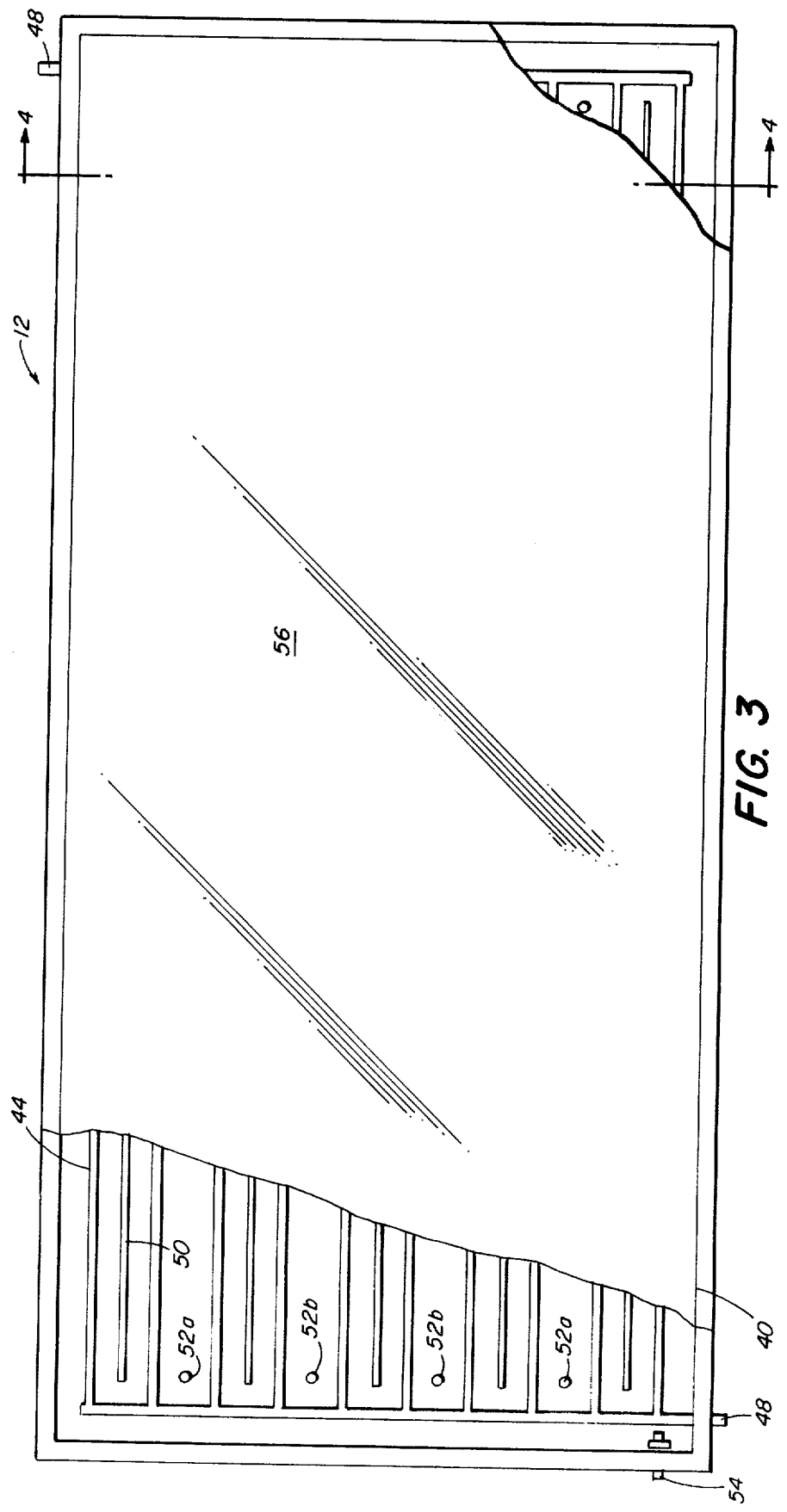
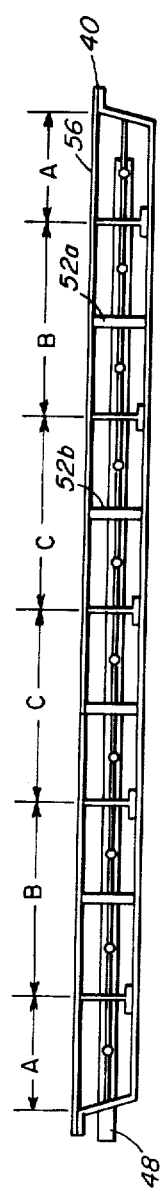
FIG. 3
FIG. 4

EVACUATED FLAT-PLATE SOLAR COLLECTORS

BACKGROUND OF THE INVENTION

Solar collectors are used in many applications to collect solar energy and to convert it to heat. In recent years, such collectors have enjoyed increasing popularity, because, once installed, they provide a relatively cost-free source of hot water for domestic usage and for home heating. Generally, a collector consists of a glass-covered array of fluid-filled tubes carried on a flat plate. The plates are designed to optimize the absorption of radiant sunlight and thus the conversion of the energy into thermal energy in the fluid passing through the tubes. The fluid in the tubes is circulated through a thermal capacitor where a heat exchange occurs. Heat, usually in the form of hot water, subsequently may be drawn from the capacitor, to provide for domestic needs or to supplement traditional heating systems.

Development of solar-heating systems in the northern portions of this country, however, has been hampered by the problem of heat loss to the ambient air in the collector and eventually to the outside air. The solutions to this problem to date have been less than satisfactory. Caulking of the frame may be employed, but the ambient air in the collector still will carry heat from the collector plate to the glass cover where it will dissipate to the outside. A plurality of glass plates also may be employed to retard heat loss; however, the more cover plates, the greater fraction of sunlight is absorbed or reflected by them and the lesser percentage of solar energy is available to the collector plate. Thus, it would be most desirable for a solar collector to be formed in a manner, whereby heat loss would be minimized, yet, at the same time, maintaining a single-sheet, glass-cover construction.

SUMMARY OF THE INVENTION

This invention relates to an improved, flat-plate, solar collector and solar systems containing such collector, as well as the process of manufacturing such a collector and the method of using it. In particular, this invention concerns evacuation of a sealed collected as a means of reducing heat losses. More particularly, a structural support system is disclosed which permits thin, glass, cover sheets to withstand the stresses associated with operation of the evacuated collector.

This invention relates to an evacuated, airtight, solar collector with a unique support system within the panel, to prevent fracture of the thin, transparent, glass sheet through which radiant energy passes. The casing of the collector panel may be constructed as a shallow, metal pan upon which a glass cover sheet is glazed and sealed. The pan is formed with fully welded corners, to insure that no leakage occurs from the pan, itself, and has at least three port holes: two for the header pipes of the collector and one for the vacuum pump. The pump line and header pipes are connected to the port holes in an airtight manner. The collector plates sit within the pan, and, upon evacuation of the collector, heat loss from the plates to the outside environment is effectively minimized.

The use of an evacuated solar panel with a glass cover sheet places stress on the glass cover sheet and subjects the glass to fracture. The invention concerns the use of a unique, glass-panel, support system for the evacuated solar collector. In particular, the invention involves an evacuated, solar-collector panel with a nonlinear, bar-type, first support system within the chamber, and, in the most preferred embodiment, an additional second support system employing a plurality of support dowels within the chamber.

The structural support system of this invention is formed by the nonlinear spacing of supports within the pan. The major supports comprise a plurality of flanged bars positioned within the pan substantially parallel to each other and the pan sides of longer dimensions. The support bars are arranged symmetrically with respect to the longitudinal center line, but in a nonlinear fashion, with the distance between the bars decreasing as the supports extend outwardly towards the edges of the pan.

In addition to the major support system, it has been discovered that further structural support can be provided by an arrangement of dowels or pins as point-support means along the edges of the pan sides of shorter dimensions. These pins are spaced apart from the edges approximately the same distance as the closest support bar is spaced apart from the pan sides of longer dimensions. Where a plurality of pins is used, it is preferable that the pins along such edge be placed on the pan in an arcuate manner, with the pins nearer the center being spaced slightly farther from the edge than those nearer the corners.

The principle of operation of the support system described above is believed to be based upon the ability of a symmetrical, but nonlinear, arrangement of supports to dampen the harmonic vibrations of the glass cover before stress fractures occur. Such fractures are known to result from transient shocks associated with temperature changes, pump start-up, seal leakage, etc.

One advantage of my evacuated collector and support system lies in the reduction of the glass-sheet thickness required to cover the evacuated collector; for example, typically less than $\frac{3}{8}''$ in thickness or $\frac{1}{4}''$ under normal vacuum conditions of over 29" of pressure. By reducing the glass thickness, economy of manufacture is afforded, as well as improved performance of the collector system; that is, more energy will be transmitted by a thinner sheet of glass.

For the purpose of illustration, my invention will be described in connection with the preferred embodiment; however, it is recognized that various changes and modifications may be made by those persons skilled in the art, all within the spirit and scope of the invention. For example, the spacing of the supports will vary with the size of the collector, with one critical parameter being not the exact spacing of the supports, but rather the symmetrical, nonlinear progression of supports to the edges of the collector. Further, the support bars can be replaced by other structures, such as a series of pins spaced apart from each other at short intervals.

Additionally, this invention may be practiced in passive solar applications, such as skylights and windows, where the space between two sheets of glass is to be evacuated to minimize heat loss. In such passive applications, a similar support system may be employed with a symmetrical, nonlinear progression of supports to the edges of the collector. In special applications, whether passive or active, where the shape of the collector or skylight or window is roughly square or circular, it may be preferable to use a central pin and a series of concentric square or circular support bars. In such cases, the basic principle of symmetrical, nonlinear progression still would be followed, with the distance between concentric squares or circles becoming smaller as the edge is approached.

Furthermore, while the preferred method of construction is to use a fully welded pan, other methods of forming a casing, such as using a peripheral frame and a base element, are equally applicable.

BRIEF DESCRIPTION OF THE DRAWINGS

FIG. 3 is a top plan view of the solar collector; and

FIG. 4 is a sectional view along line 4—4 of FIG. 3.

DESCRIPTION OF THE EMBODIMENTS

Figure 1:
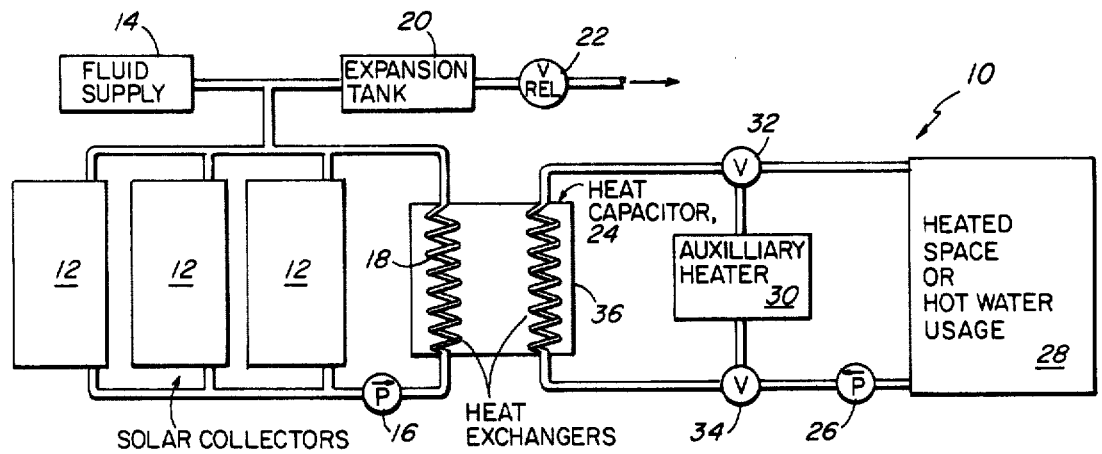
FIG. 1 is a schematic diagram of a prior-art, solar-energy system.

Referring to FIG. 1, there is shown a prior-art, solar-energy system 10 utilizing fluid-type solar collectors 12. Fluid is initially introduced into the collector from an outside source 14. In the collector, the fluid is heated and then is circulated via pump 16 to the heat capacitor 24 where heat is exchanged by an exchanger 18; for example, a copper coil or finned tube immersed in the heat capacitor 24. The collector fluid, depleted of heat, is returned to the collector for another cycle. The fluid-circulator system is typically also provided with an expansion tank 20 and a release valve 22. The fluid used in the collector may be water, oil or solutions of ethylene glycol or propylene glycol.

Once the heat capacitor 24 is charged, it may be used to provide for domestic needs. Water for domestic usage or space heating 28 can be heated by circulating it via pump 26 to the heat capacitor 24. At the capacitor 24, the water is heated using a second heat exchanger 36 and then is put to use. In most systems, an auxiliary, conventional heater 30, with attendant valves 32 and 34, is also connected to the system to provide a standby heating source.

Figure 2:
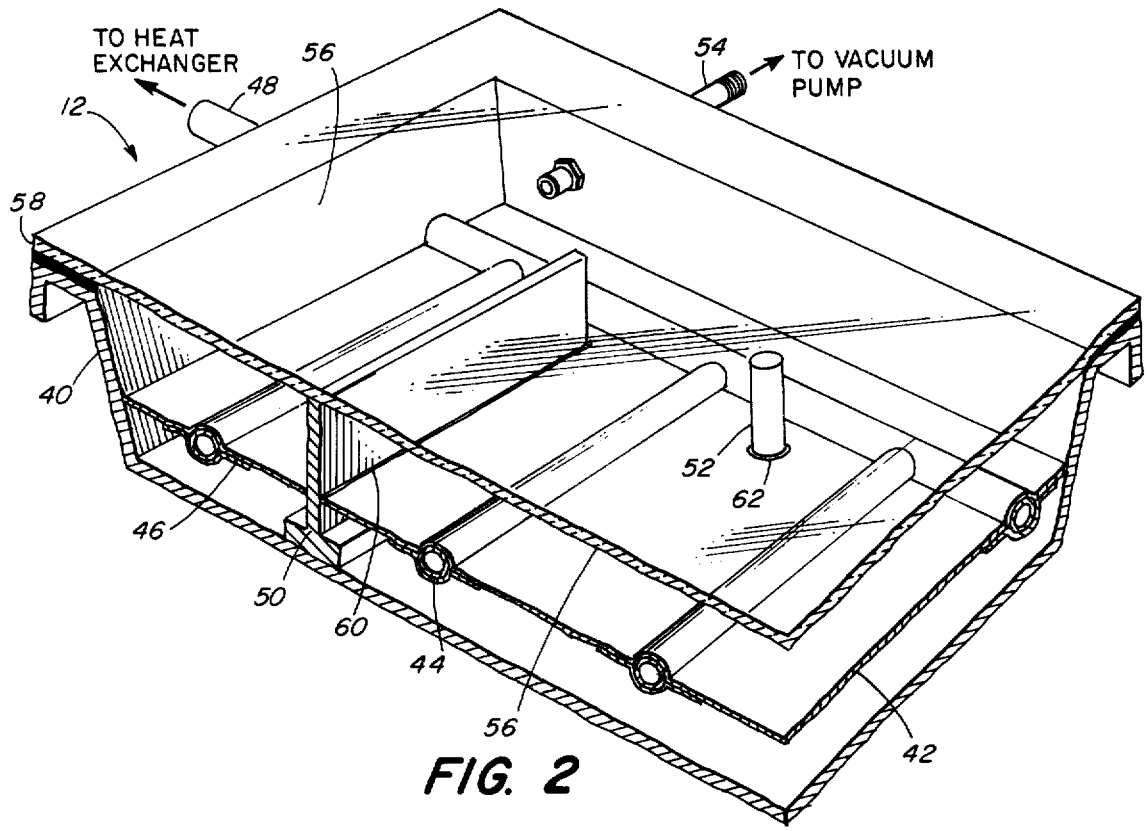
FIG. 2 is a sectional, perspective view of the evacuated solar collector of the invention.

With reference to FIGS. 2 and 3, the evacuated solar collectors 12 and support system 50 of my invention are shown in the preferred embodiment. The evacuated chamber is formed by a shallow metal pan 40 and a glass cover 56 glazed thereon, using a vacuum-tight sealant or gasket material 58. The pan 40 requires three ports, two of which receive the header pipes 48 which provide for fluid passage in and out of the collector, and the third port receives the piping 54 from the vacuum pump. Each of the ports are fitted with such gaskets, as known in the art, to insure an airtight operation. A vacuum pump of known construction (not shown) is used to provide evacuation. A pump with a power-rating of 0.3 horsepower or more is preferred, and it has been found that such a pump can provide a 99.9% vacuum which is deemed more satisfactory then lesser vacuums.

As can be seen from the figures, particularly FIG. 2, an assembly of metal piping and heat-absorbing plates sits within the evacuated chamber. The header pipes 48 are typically constructed from an 0.5-inch copper tubing and are connected to each other by a plurality of smaller tubes 44. Preferably, these tubes are 0.25-inch copper pipes pressed into an oval shape and silver-soldered to the header pipes 48. The oval tubes 44 are sandwiched by an upper absorbing plate 42 and lower back plates 46, which are spot-welded together to pinch tightly the oval tube therebetween. The absorbing plate 42 and back plates 46 may be constructed of copper, and the absorbing plate is preferably finished with a material, such as chrome sulfate, "nickel black," cupric oxide or "ebanol C," which maximizes sunlight absorption. As can be seen in FIG. 2, the header pipers 48, oval tubes 44, the absorber plate 42 and the back plates 46 form an integrated collector-plate assembly, with slots 60 and holes 62 fabricated in the absorber plate, to allow the collector-plate assembly to slide over the structural support system (discussed below) and rest in the evacuated chamber.

The preferred dimensions of the pan are as folllows: length—76 inches; width—34 inches; and depth—1.25 inches. It is also preferred that the pan be constructed with a 1.0-inch land on top upon which the glass cover may be glazed.

As the result of a series of stress-fracture tests, it has been discovered that five, properly placed, internal stays or longitudinal, flanged bars 50 can support the glass cover 56 in a system of the dimensions described above. The preferred shape of the internal stays is an inverted "T" bar, with the flanged base resting in the pan and the top of its stem contacting the glass cover. Other bar shapes, such as triangular bars, also may be employed.

The conventional engineering solution to the problem of staying a flat surface is to apply a formula such as:

$$S = \sqrt{\frac{C\, t^2}{P}}$$

where S is the distance between stays; t is the thickness of the flat surface; P is the pressure or load to be supported by the surface; and C is a constant which insures dimensional consistency and is dependent on a number of factors, such as the material comprising the flat surface, its elasticity, etc. It should be noted that the assumption in conventional engineering practice is that a plurality of uniformly spaced stays are necessary. Under such an analysis, I have found that as many as eight longitudinal bars might be necessary to stay the glass cover of my evacuated solar collector.

I have discovered, however, that the number of stays needed to support the glass cover can be unexpectedly reduced by placing the stays in the collector in a nonuniform fashion. The advantages of reducing the number of stays are twofold in that economy of manufacture is achieved and the effective heat-absorbing surface area of the collector is increased.

As the result of a series of tests conducted on tempered glass of dimensions of 76"×34"×0.125 (2/16)" at a pressure of 15 psi, it was found that five internal, continuous, longitudinal stays (about 70" long) would provide the necessary support, so long as they were placed in a symmetrical, but nonlinear, arrangement as follows: one along the longitudinal center line; a set of two, each being 7" in from the center line; and a second set of two, each being 6½" from the corresponding number of the first set and 3½" from the inner edge of the pan. The following table summarizes this relationship:

TABLE I (for a glass sheet 76"×34— ×0.125")

c = 7"
b = 6.5"
a = 3.5"

As can be seen from FIG. 4, c is the distance from the central stay to the first set of stays; b is the distance from the first set to the second set of stays; and a is the distance from the second set of stays to the inner edge of the pan.

These ratios are believed to be effective over a wide range of collector sizes. Thus, for example, for a glass cover of dimensions larger or smaller than the preferred embodiment, the lengths between stays would be summarized as follows in Tables II and III:

TABLE II (for a glass sheet 90"×41"×0.125")

c=8.5"
b=8.0"
a=4.25"

TABLE III (for a glass sheet 60"×27.5"×0.125)

c=5.75"
b=5.25"
a=2.75"

In some instances, it is preferred that an even number of stays be employed. In such cases, a stay would not be situated along the longitudinal center line, but symmetry, with respect to the center line, still would be maintained. For example, the glass sheet described in Table II could be supported by six stays in lieu of five. A first set of stays would be positioned 3.5 inches on each side of the center line, set apart from each other by a total of 7 inches. A second set of stays would be located 7 inches from each of the first stays and closer to the outer edge of the glass. The third set would be placed 6.5 inches from each of the second stays and 3.5 inches from the edge. A similar arrangement using four stays can be utilized with the cover described in Table III in lieu of the five-stay configuration.

It also has been found that, for oversized solar collectors, such as collectors wider than 50", it is preferable to have seven longitudinal stays, rather than five, with the distance between stays again varying in a symmetrical, but nonlinear, manner from the center line to the edges of the collector.

With reference to FIGS. 3 and 4, the nonlinear spacing of the longitudinal bars is shown. In addition, FIGS. 3 and 4 disclose the use of dowels or pins 52 as auxiliary supports along the sides of shorter dimensions. It has been found that a series of four dowels along each of these sides provides additional insurance against stress fractures originating along these sides. In the preferred embodiment, along each of the shorter sides, two dowels 52b are each placed in the middle of the C spans; that is, equidistant from the central stay and the stays on each side of the central stay. Two additional dowels 52a are each placed in the middle of the B spans; that is, equidistant from the two stays on each side of the central stay. In the pan of most preferred dimensions (length—76 inches; width—34 inches; depth—1.25 inches), it has been found that the dowels 52a should be spaced 2⅝ inches from the inside box edge, while dowels 52b should be spaced 3.0 inches from the inside box edge.

An evacuated solar collector constructed in accordance with the foregoing description will insure that a properly seated glass cover ⅛-inch thick will not develop stress fractures. However, in the preferred embodiment, it is recommended that a glass cover 3/16-inch thick be employed as added protection against stress fractures.

What I claim is:

1. In a solar collector for the conversion of solar radiation to thermal energy, which solar collector comprises:
   (a) a peripheral frame member;
   (b) a lower sheet member;
   (c) a single, upper, thin, glass sheet member;
   (d) the frame member and lower and upper sheet members forming a shallow, sealed chamber adapted to be evacuated to a subatmospheric pressure or at a subatmospheric pressure;
   (e) a chamber absorber means containing a fluid, to permit the fluid to absorb solar radiation passing through the upper, thin, glass sheet member, and to convert the solar radiation to thermal energy in the fluid, to increase the temperature of the fluid;
   (f) means to introduce fluid, at one low temperature, into the absorber means and means to remove a higher temperature fluid from the absorber means;
   (g) means to support the upper, thin, glass sheet member, the improvement which comprises
   a plurality of spaced-apart, generally parallel, glass sheet support elements within the chamber, and extending substantially the length of the chamber and positioned in a symmetrical, but nonlinear, manner with respect to the longitudinal center line of the chamber, so that the distance between the longitudinal support elements decreases as the support elements extend outwardly in position toward the peripheral edge of the frame member, so that the support elements dampen the harmonic vibrations of the supported, upper thin, glass sheet element, prior to the occurrence of stress fractures in the glass sheet element, thereby preventing fracture of the glass sheet element, when the chamber is under subatmospheric pressure.

2. The collector of claim 1 wherein the thin, glass sheet element has a thickness of ⅛ths of an inch or less.

3. The collector of claim 1 wherein the support elements comprise a generally inverted-shaped, T-bar element.

4. The collector of claim 3 wherein the base of the inverted T-bar element rests on the lower member.

5. The collector of claim 1 wherein the upper, thin, glass element has a thickness of about 3/16ths of an inch or less, and the chamber has a subatmospheric pressure of 29 inches of mercury or less.

6. The collector of claim 1 wherein the frame element is rectangular in form, and the support elements are generally parallel to the sides of the frame element of larger dimension.

7. The collector of claim 1 wherein the support elements comprise at least five support elements.

8. The collector of claim 1 wherein the absorber means comprises a plurality of fluid-filled, generally parallel tubes spaced apart by a generally flat, heat-absorbing and conductive plate element.

9. The collector of claim 1 which includes a vacuum pump and means to connect the chamber with the vacuum pump, to maintain the chamber at subatmospheric pressure.

10. The collector of claim 9 which includes pump means to circulate the fluid through the absorber means.

11. The collector of claim 1 which includes a second support means which comprises a plurality of point support elements positioned in the chamber and generally along the sides of the frame element of shorter dimension, to provide additional support to the upper, thin, glass element.

12. The collector of claim 11 wherein the point support elements are positioned in a general arcuate form, so that the point supports nearer the longitudinal center line are positioned farther from the short-dimension side of the frame element than the point support elements positioned near the corner of the frame element.

13. The collector of claim 11 wherein the point support elements are dowel elements having a diameter of about ½ an inch or more.

14. In a solar collector for the conversion of solar radiation to thermal energy, which solar collector comprises:

(a) a peripheral, rectangular frame member;
(b) a lower sheet member;
(c) a single, upper, thin, glass sheet member having a thickness of ⅜ths of an inch or less;
(d) the frame member and lower and upper sheet members forming a shallow, sealed chamber adapted to be evacuated to a subatmospheric pressure or at a subatmospheric pressure;
(e) a chamber absorber means containing a fluid in the chamber, to permit the fluid to absorb solar radiation passing through the upper, thin, glass sheet member, and to convert the solar radiation to thermal energy in the fluid, to increase the temperature of the fluid;
(f) means to introduce the fluid, at one low temperature, into the absorber means and means to remove a higher temperature fluid from the absorber means; and
(g) means to support the upper, thin, glass sheet member, the means to support generally parallel to the sides of the frame element of larger dimension, the improvement which comprises a plurality of spaced-apart, generally parallel, glass sheet first support elements within the chamber, and extending substantially the length of the chamber and positioned in a symmetrical, but nonlinear, manner with respect to the longitudinal center line of the chamber, so that the distance between the longitudinal support elements decreases as the support elements extend outwardly in position toward the peripheral edge of the frame, and a plurality of second point support elements positioned in a generally arcuate form, so that the point supports nearer the longitudinal center line are positioned farther from the short-dimension side of the frame element than the point support elements near the corner of the frame element, the nonlinear and arcuate positions of the first and second support elements dampening the harmonic vibrations of the upper, thin, glass sheet element, prior to the occurrence of stress fractures in the glass sheet element, thereby preventing fracture of the glass sheet element, when the chamber is under subatmospheric pressure.

15. The collector of claim 14 wherein the support elements comprise at least five support elements.

16. The collector of claim 14 wherein the point support elements are dowel elements having a diameter of about ½ an inch or more.

* * * * *